(12) United States Patent
Choi et al.

(10) Patent No.: US 10,091,134 B2
(45) Date of Patent: Oct. 2, 2018

(54) OPEN M2M SYSTEM AND METHOD

(71) Applicant: Korea Electronics Technology Institute, Seongnam-si, Gyeonggi-do (KR)

(72) Inventors: Sung Chan Choi, Seoul (KR); Jae Ho Kim, Yongin-si (KR); Kwang Ho Won, Yongin-si (KR); Sang Shin Lee, Yongin-si (KR); Il Yeup Ahn, Yongin-si (KR); Min Hwan Song, Seoul (KR); Jae Seok Yun, Yongin-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 287 days.

(21) Appl. No.: 14/889,477

(22) PCT Filed: May 9, 2014

(86) PCT No.: PCT/KR2014/004143
§ 371 (c)(1),
(2) Date: Nov. 6, 2015

(87) PCT Pub. No.: WO2014/182115
PCT Pub. Date: Nov. 13, 2014

(65) Prior Publication Data
US 2016/0094485 A1 Mar. 31, 2016

(30) Foreign Application Priority Data

May 9, 2013 (KR) .................. 10-2013-0052453
Aug. 13, 2013 (KR) .................. 10-2013-0095832
May 9, 2014 (KR) .................. 10-2014-0055320

(51) Int. Cl.
*G06F 15/173* (2006.01)
*H04L 12/911* (2013.01)
(Continued)

(52) U.S. Cl.
CPC ...... *H04L 47/827* (2013.01); *G06F 17/30997* (2013.01); *H04L 41/0893* (2013.01);
(Continued)

(58) Field of Classification Search
CPC ... H04L 47/827; H04L 41/0893; H04L 67/16; H04L 41/082; G06F 17/30997; H04W 4/003; H04W 4/005
(Continued)

(56) References Cited

U.S. PATENT DOCUMENTS 9,426,222 B2 * 8/2016 Wang .................. H04W 4/70
9,615,346 B2 * 4/2017 Kim .................... H04W 4/70
(Continued)

FOREIGN PATENT DOCUMENTS

EP       2 523 528      11/2012
WO    2012/109531       8/2012

OTHER PUBLICATIONS

International Searching Authority International Search Report for PCT/KR2014/004143 dated Aug. 11, 2014.
(Continued)

*Primary Examiner* — Imad Hussain
(74) *Attorney, Agent, or Firm* — Sughrue Mion, PLLC

(57) ABSTRACT

An open M2M system and a method are provided. A method for managing resources according to an exemplary embodiment of the present invention includes: registering resources existing in a first domain at a second domain; and discovering metadata of a desired resource in the second domain. Accordingly, information management and sharing can be optimized, and registration and discovery of resources can be supported to be performed on a global scale.

20 Claims, 5 Drawing Sheets

(51) Int. Cl.
*H04W 4/70* (2018.01)
*H04W 4/60* (2018.01)
*H04L 29/08* (2006.01)
*H04L 12/24* (2006.01)
*G06F 17/30* (2006.01)

(52) U.S. Cl.
CPC ............... *H04L 67/16* (2013.01); *H04W 4/60* (2018.02); *H04W 4/70* (2018.02); *H04L 41/082* (2013.01)

(58) Field of Classification Search
USPC ........................................................ 709/226
See application file for complete search history.

(56) References Cited

U.S. PATENT DOCUMENTS

| | | | | |
|---|---|---|---|---|
| 9,717,027 | B2* | 7/2017 | Ahn | ................ H04L 12/66 |
| 9,955,348 | B2* | 4/2018 | Kim | ................ H04W 4/70 |
| 2004/0162871 | A1* | 8/2004 | Pabla | ................ H04W 8/005 |
| | | | | 709/201 |
| 2008/0189312 | A1 | 8/2008 | Taranov et al. | |
| 2012/0110647 | A1 | 5/2012 | Guo et al. | |
| 2014/0126581 | A1* | 5/2014 | Wang | ................ H04W 4/70 |
| | | | | 370/431 |
| 2015/0245205 | A1* | 8/2015 | Kim | ................ H04W 72/10 |
| | | | | 726/4 |
| 2015/0296470 | A1* | 10/2015 | Kim | ................ H04W 4/70 |
| | | | | 455/435.2 |
| 2015/0350904 | A1* | 12/2015 | Kim | ................ H04W 4/70 |
| | | | | 455/411 |
| 2015/0358874 | A1* | 12/2015 | Ahn | ................ H04L 12/66 |
| | | | | 370/331 |
| 2016/0007137 | A1* | 1/2016 | Ahn | ................ H04W 4/70 |
| | | | | 370/254 |
| 2017/0013063 | A1* | 1/2017 | Wang | ................ H04W 4/70 |

OTHER PUBLICATIONS

European Patent Office, Communication issued Nov. 11, 2016 in European Application No. 14 79 4803.

"Group Management in GwMO; OMA-DM-GwMO-2010-0034", XP064070142, Aug. 27, 2010, pp. 1-12.

* cited by examiner

OPEN M2M SYSTEM AND METHOD

CROSS REFERENCE TO RELATED APPLICATIONS

This application is a National Stage of International Application No. PCT/KR2014/004143 filed May 9, 2014, claiming priority based on Korean Patent Application Nos. 10-2013-0052453 filed May 9, 2013, 10-2013-0095832 filed Aug. 13, 2013, and 10-2014-0055320 filed May 9, 2014, the contents of all of which are incorporated herein by reference in their entirety.

TECHNICAL FIELD

The present invention relates to a Machine to Machine (M2M) system, and more particularly, to an open M2M system and a method for managing resources and providing interfaces and functions thereof.

BACKGROUND ART

As information and communication technologies have developed, networking and Internet environments which were established based on computers, such as personal computers or laptop computers, have been changed to operate based on small mobile devices such as smart phones, Personal Digital Assistants (PDAs), and portable multimedia devices.

However, small devices which are capable of calculating, communicating, and networking may be attached to normal objects such as meters and thermometers as well as information devices. The small devices attached to objects can automatically acquire information on the objects or can mutually share the information through communication networks among the objects.

Internet of Things (IoT), M2M, and the like refer to a concept and technology which has things connected to a network using communication devices attached to the things or establishes a communication network between things and shares information.

In the above-described network environment, communication networking can be performed person to person, person to thing, or thing to thing, and thus information can be shared among all objects. This may be considered as an essential technical element for evolving into a future ubiquitous information service society.

There is a demand for an M2M system which can optimize information management and sharing, and a method for efficiently managing resources constituting the M2M system.

The "IoT" is defined as "a new information communication infrastructure that connects all kinds of things existing in the world through networks and enables persons and things to communicate with each other anytime and anywhere." That is, the IoT may be considered as an infrastructure for realizing a ubiquitous space in which things can be connected with one another anytime and anywhere.

To achieve the IoT, all devices should be registered at a discovery service platform to be discovered, and should be connected with one another to be able to receive services. Therefore, there is a need for a method for managing resources of a registration and discovery server and defining a system, and also, there is a need for a system for allowing various IoT devices to provide IoT services by registering and discovering information.

DISCLOSURE

Technical Problem

To address the above-discussed deficiencies of the prior art, it is a primary aspect of the present invention to provide an M2M system which can optimize information management and sharing, and a method for efficiently managing resources constituting the M2M system.

Another aspect of the present invention is to provide a method for globally registering and discovering resources in an open M2M system, and reference interfaces between functional elements of the open M2M system.

Another aspect of the present invention is to provide a system for registering and discovering IoT devices for providing IoT services, and reference interfaces between functional elements for managing information, sharing resources, and discovering and accessing devices through an M2M architecture.

Another aspect of the present invention is to provide Common Services Functions (CSFs) through an M2M architecture.

Technical Solution

According to one aspect of the present invention, a method for managing resources includes: registering resources existing in a first domain at a second domain; and discovering metadata of a desired resource in the second domain.

The resources may include at least one of a topic, a device, and application, and the topic may be a group of devices related to a specific topic.

The registering may be performed by a topic owner, a device owner, and an application developer, and the discovering may be performed by a user.

The second domain may include at least one of a topic directory which maintains metadata of a topic, a device directory which maintains metadata of a device, and an application directory which maintains metadata of an application, and the metadata of the device may be published in the metadata of the topic including the device.

The metadata of the device and the metadata of the application related to the device may refer to each other.

The discovering may include discovering an application related to a device when the device is discovered.

The discovering may include discovering a device related to an application when the application is discovered.

The method may further include accessing the resources existing in the first domain in an M2M method or a P2P method with reference to the metadata.

The M2M method may be a method for accessing resources through a third domain interacting with the first domain and the second domain, and the P2P method may be a method for accessing resources without passing through the third domain.

Advantageous Effects

According to exemplary embodiments of the present invention as described above, information management and sharing can be optimized, and also, resource registration and discovery can be supported to be performed on a global scale.

In addition, reference interfaces for interworking between the functional elements (an application, a resource service entity, an application repository, a directory manager, etc.)

constituting the open M2M system are provided, so that the functional elements can be used as standard elements for the reference when the present system is understood and developed through common interfaces for mutually accessing, interworking, and forwarding data between the functional elements. In addition, various CSFs can be provided through the M2M architecture.

BEST MODE

Hereinafter, the present invention will be described in more detail with reference to the accompanying drawings.

1. Open M2M Architecture

Figure 1:
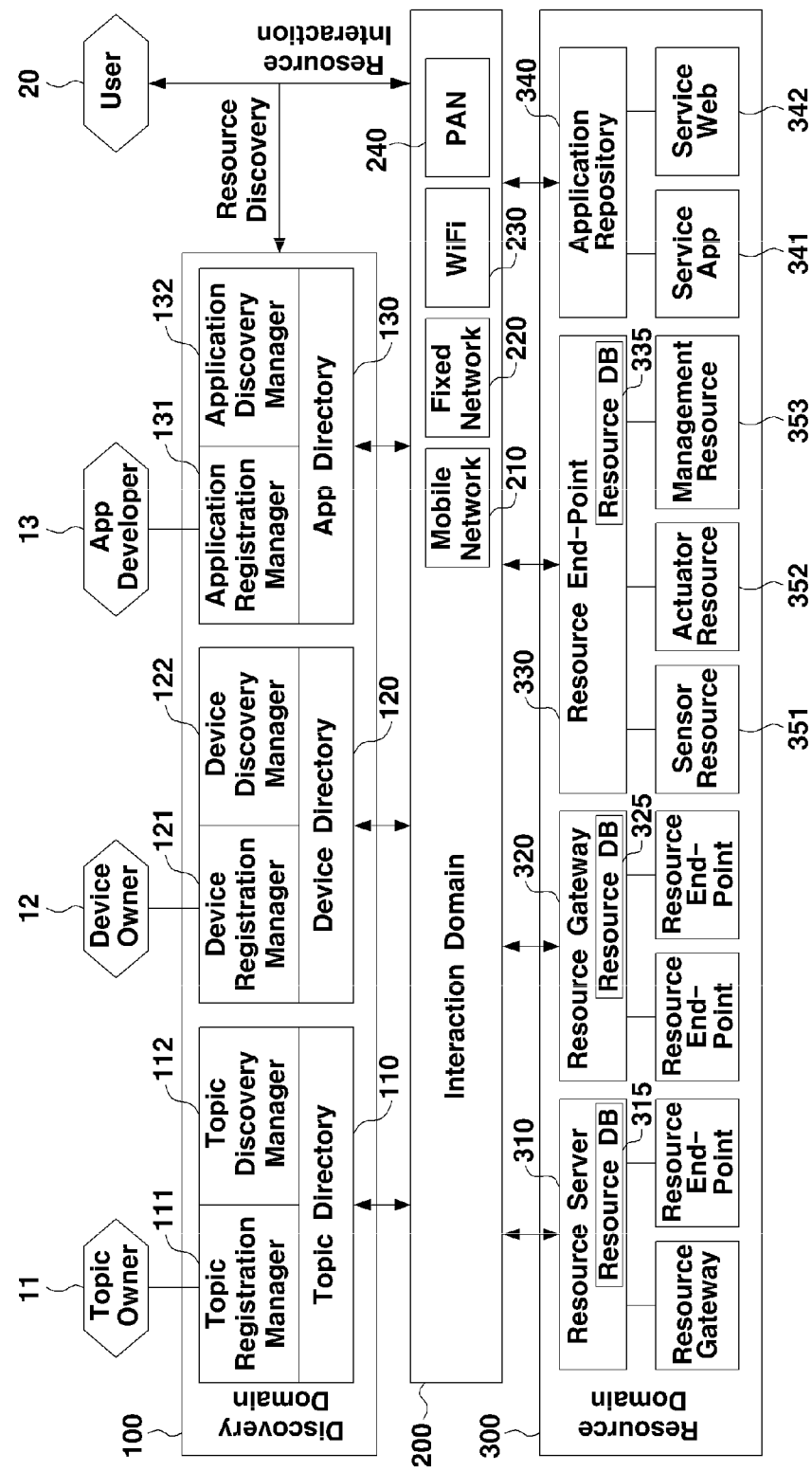
FIG. 1 is a view showing an architecture of an open M2M system to which the present invention is applicable.

FIG. 1 is a view showing an architecture of an open M2M system to which the present invention is applicable. The open M2M system to which the present invention is applicable is a system for supporting registration, discovery, and access of resources on a global scale (global environment). In the open M2M system to which the present invention is applicable, communication between a user and resources may be performed by both the M2M communication and the P2P communication.

The term "global scale" implies the ability to register, discover, and access resources existing all over the world. However, the range of registration, discovery, and access may be limited smaller than the global scale depending on the limitation of implementation and necessity.

The "resource" is a physical element or a virtual element which provides useful data to a user in the open M2M architecture. The resource includes a topic, a device, and an application and may further include a content, a context, a service, etc.

The "topic" refers to a group of devices which are related to a common topic of interest in the open M2M architecture. For example, the "topic" may be a group of a temperature sensor, a humidity sensor, and an illuminance sensor which are related to measurement of environmental information such as temperature, humidity, and illuminance. The "topic" will be described in detail below.

As shown in FIG. 1, the open M2M system to which the present application is applicable includes a discovery domain 100, an interaction domain 200, and a resource domain 300.

The discovery domain 100 includes a topic directory 110, a device directory 120, and an application directory 130.

The topic directory 110 supports registration and discovery of a topic. To achieve this, the topic directory 110 includes a topic registration manager 111 to register a topic of a topic owner 11, and a topic discovery manager 112 to provide the result of discovery of a topic to a user 20.

The registration and discovery supported in the topic directory 110 are achieved in a topic-based method. That is, the topic registration is achieved by registering devices to be included in the topic, and the result of the discovery of the topic is provided by providing the devices included in the topic.

The device directory 120 supports registration and discovery of a device. To achieve this, the device directory 120 includes a device registration manager 121 to register a device of a device owner 12, and a device discovery manager 122 to provide the result of discovery of a device to the user 20.

Herein, the device is a concept which includes a resource server 310, a resource gateway 320, a resource end-point 330.

The application directory 130 supports registration and discovery of an application. To achieve this, the application directory 130 includes an application registration manager 131 to register an application of an application developer 13, and an application discovery manager 132 to provide the result of discovery of an application to the user 20.

The resource domain 300 includes the resource server 310, the resource gateway 320, the resource end-point 330, and an application repository 340.

As shown in FIG. 1, the resource server 310 may have a resource gateway or a resource end-point connected thereto on a lower layer thereof, and the resource gateway 320 may have a resource end-point connected thereto on a lower layer thereof. That is, the resource end-point may be connected to the resource server as well as the resource gateway.

The resource end-point 330 includes a sensor resource 351 to create resource data, an actuator resource 352 to control, and a management resource 353 to manage.

The application repository 340 stores a service application 341 and a service web 342. The service application 341 is an application which receives resource data from a device or controls a device, and the service web 342 may be a Universal Resource Locator (URL) of a web page which receives resource data from a device or controls a device.

The interaction domain 200 is a domain to interact between the discovery domain 100 and the resource domain 300, and may include a mobile network 210, a fixed network, WiFi 230, and a PAN, and may further include other fixed/wireless networks which are not mentioned.

The resource domain 300 may interact with the discovery domain 100 through the interaction domain 200.

The devices 310, 320, and 330 maintain resource DBs 315, 325, 335 which maintain resource data, and/or pointers (not shown) which are linked with other resource DBs. Accordingly, 1) the resource server 310 may manage the resource data of the resource gateway and the resource end-point registered thereat, 2) the resource gateway 320 may manage the resource data of the resource end-point registered thereat, and 3) the resource end-point 330 may manage the resource data of the sensor, actuator, and management resources registered thereat.

The user 20 may access the resource data through the interaction domain 200. Specifically, the "user 20" refers to a user terminal which is owned by a user, but the term "user" will be used for the sake of easy understanding and denotation.

To access the resource data, the user 20 discovers the resources in the topic directory 110, the device directory 120, and the application directory 130 of the discovery domain 100 first.

Then, the user 20 may access the resource data of the discovered resources through the interaction domain 200. In the open M2M architecture, the user 20 may access the resource data of the resource end-point in two communication methods.

One is an indirect M2M communication method, in which the user 20 accesses the resource data of the resource end-point through the resource server or the resource gateway. The other is a direct P2P communication method, in which the user 20 directly accesses the resource data of the resources of the resource end-point.

2. Functions of Open M2M System

Hereinafter, the functions of the open M2M system illustrated in FIG. 1 will be explained in detail.

2.1 Registration and Discovery of Resources

Figure 2:
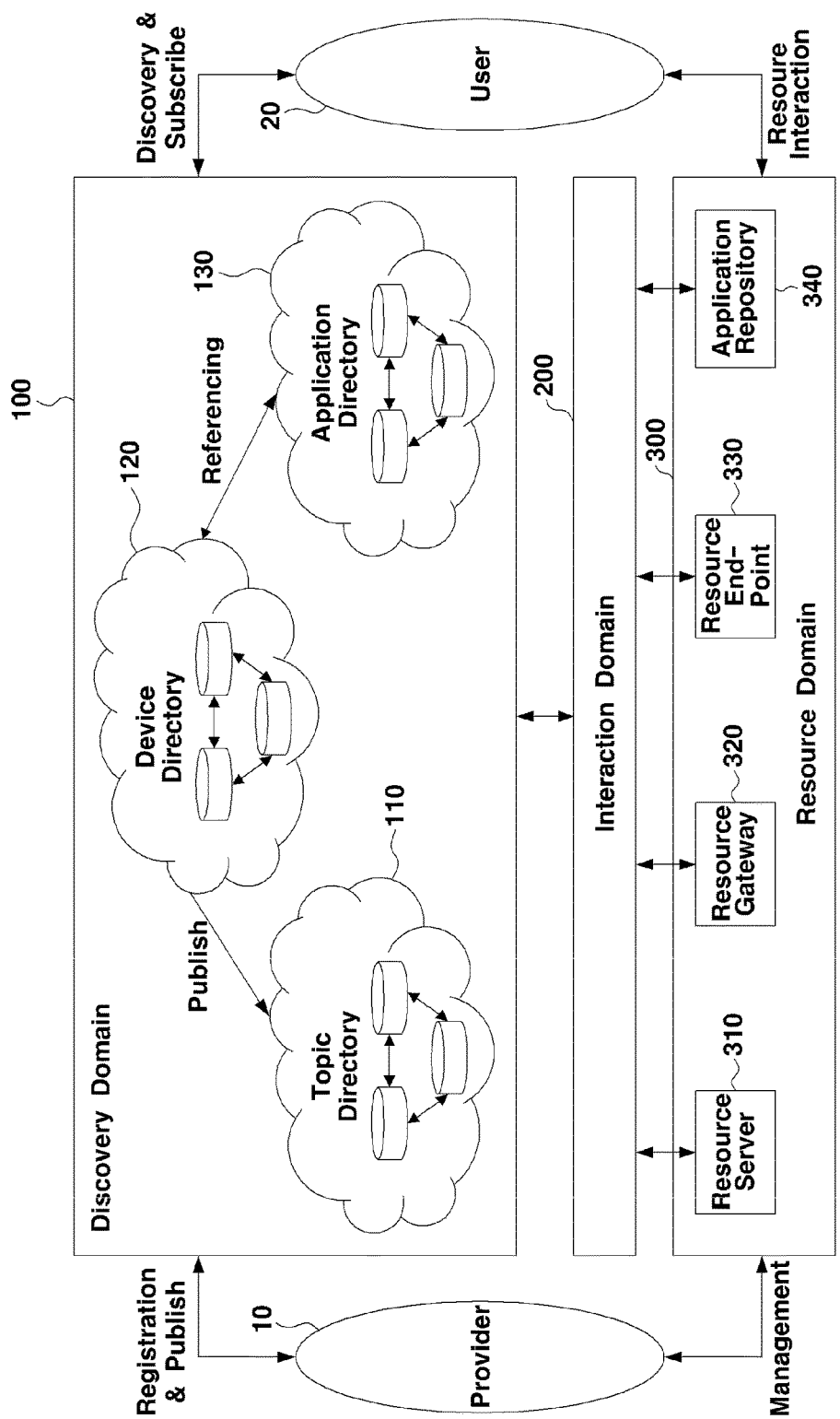
FIG. 2 is a view to illustrate a resource registration and discovery process in an open M2M system.

The open M2M system provides a resource registration and discovery process on the global scale through the discovery domain 100. As described above, the resource includes a topic, a device, an application, etc. FIG. 2 is a view to illustrate the resource registration and discovery process in the open M2M system.

The discovery domain 100 maintains resource metadata which records information on real resources existing in the resource domain 300. Specifically, 1) the topic directory 110 maintains metadata on a topic, 2) the device directory 120 maintains metadata on a device, and 3) the application directory 130 maintains metadata on an application.

A provider 10 may register the resources at the discovery domain 100 and publish the resources. Herein, the provider 10 is a term which encompasses the topic owner 11, the device owner 12, and the application developer 13.

The user 20 may globally discover the resources in the discovery domain 100 and subscribe to the resources.

The device metadata in the device directory 120 may be published in the topic directory 110. Specifically, when a device is included in a topic, the metadata of the corresponding device is published in the metadata of the corresponding topic.

In addition, the device metadata in the device directory 120 and the application metadata in the application directory 130 may refer to each other (may be related to each other).

Accordingly, when an application is found in the application directory 130, the user 20 may find a device related to the application (a device referring to the application).

To the contrary, when a device is found in the device directory 120, the user 20 may find an application related to the device (an application referring to the device).

After discovering the resource metadata in the discovery domain 100 in this method, the user 20 may access the resources 310, 320, 330, and 340 of the resource domain 300 through the interaction domain 200 with reference to the metadata.

2.2. Publication and Subscription of Topic-Based Resource, and Access Control

Figure 3:
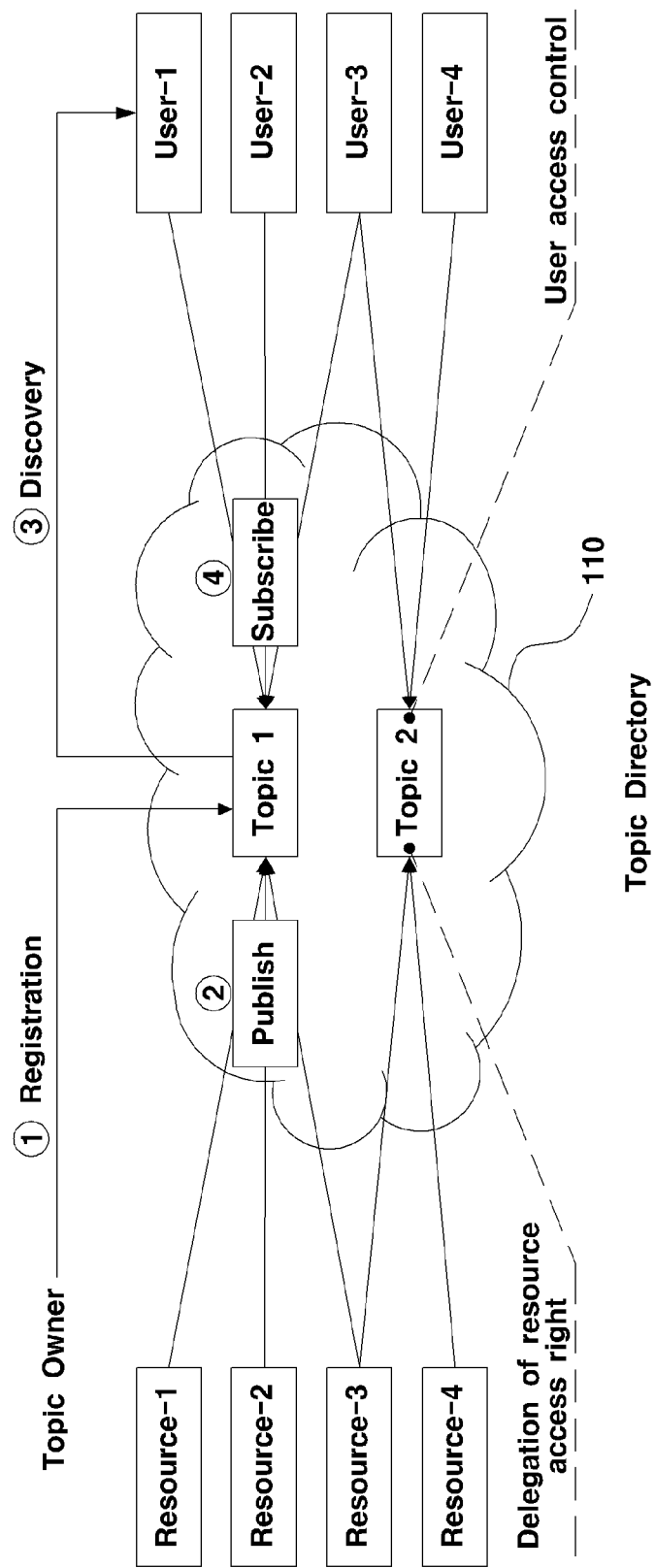
FIG. 3 is a view to illustrate a topic-based resource publication and subscription process and an access control process in an open M2M system.

Hereinafter, a topic-based resource publication and subscription process and a resource access control process in the open M2M system will be explained in detail with reference to FIG. 3. FIG. 3 is a view to illustrate a topic-based resource publication and subscription process and an access control process in the open M2M system.

As shown in FIG. 3, the topic owner creates a topic and registers the topic at the topic directory 110 (①). In FIG. 3, topic-1 and topic-2 are created and registered at the topic directory 110.

Then, resources included in the topic are published in the topic created in the topic directory 110 (②). As shown in FIG. 3, single resource-3 may be published in a plurality of topics-1 and 2.

Accordingly, the users may discover the topics in the topic directory 110 (③). In addition, the users may subscribe to a desired specific topic in the topic directory 110, and acquire the resource data related to the topic (④).

To achieve this, the authority to access the published resources may be assigned to the topic when the resources are published in the topic. In addition, when the user subscribes to a specific topic, the user may acquire the authority to access the resources related to the topic.

2.3 Structure of M2M Resource DB

Figure 4:
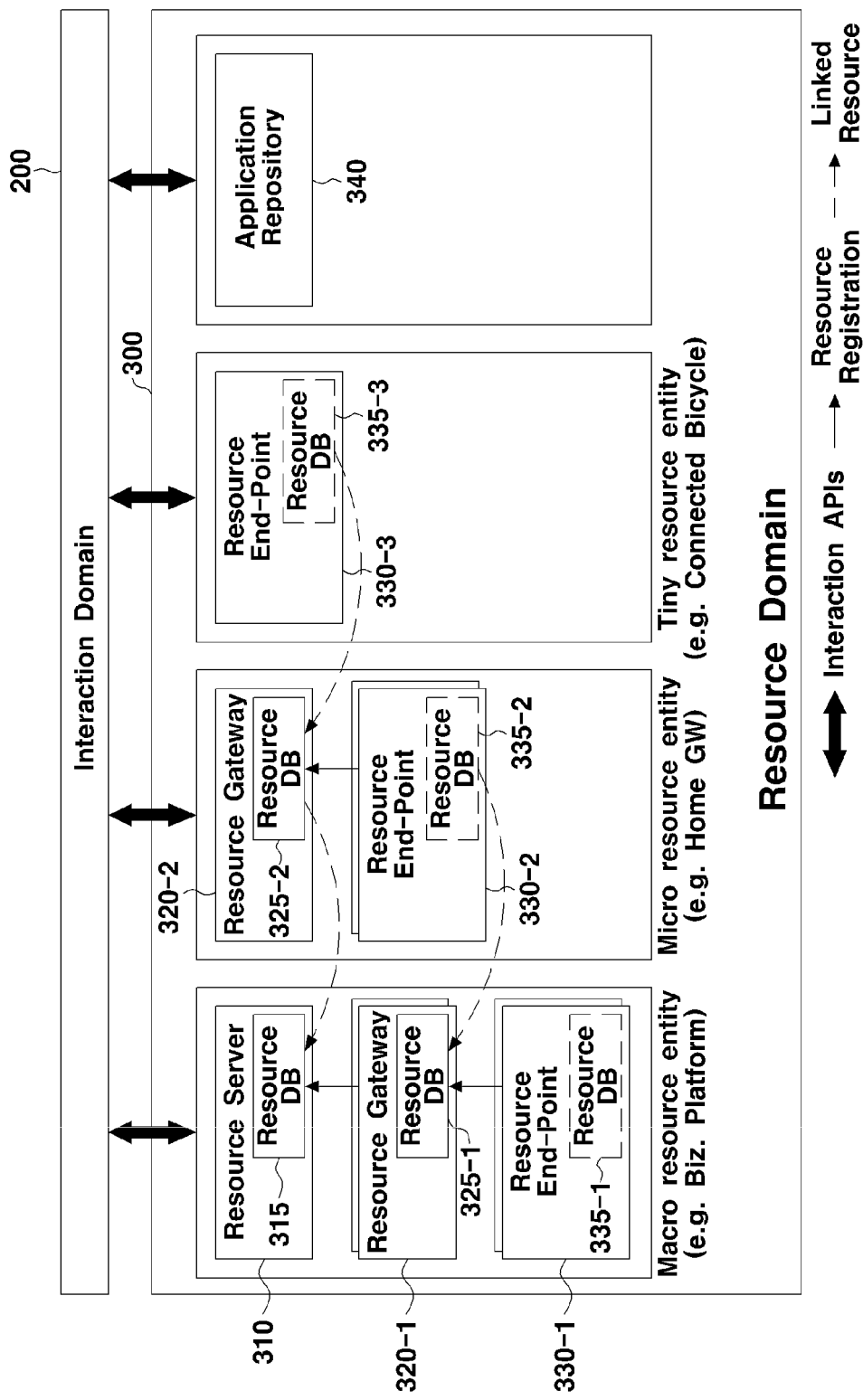
FIG. 4 is a view to illustrate a resource database (DB)

Hereinafter, the structure of a resource DB which is maintained by a device in the open M2M architecture will be explained in detail with reference to FIG. 4. FIG. 4 is a view to illustrate a resource DB.

As described above with reference to FIG. 1, the resource server 310, the resource gateways 320-1 and 320-2, and the resource end-points 330-1, 330-2, and 330-3 maintain their respective resource DBs 315, 325-1, 325-2, 335-1, 335-2, and 335-3. However, a legacy device (not shown) does not maintain a resource DB.

As shown in FIG. 4, devices may be divided into a macro resource entity, a micro resource entity, and a tiny resource entity according to the connection/establishment form of the devices.

The macro resource entity includes all of the resource server 310, the resource gateway 320-1, and the resource end-point 330-1. An SCLS-based model in the ETSI standard may be considered as a type of macro resource entity, which is defined in the exemplary embodiments of the present invention.

In the macro resource entity, the user may access the resource data of the resource end-point 330-1 through the resource server 310 and the resource gateway 320-1. That is, the resource end-point 330-1 may provide the resource data to the user through the resource gateway 320-1 and the resource server 310.

The micro resource entity does not include the resource server and includes only the resource gateway 320-2 and the resource end-point 330-2. In the micro resource entity, the user may access the resource data of the resource end-point 330-2 through the resource gateway 320-2. That is, the resource end point 330-2 provides the resource data to the user through the resource gateway 320-2.

The tiny resource entity does not include the resource server and the resource gateway and includes only the resource end-point 330-3. In the tiny resource entity, the user may access the resource data of the resource end-point 330-3 without passing through the resource server and the resource gateway. That is, the resource end-point 330-2 provides the resource data to the user without passing through the resource server and the resource gateway.

The resource DBs 315, 325-1, 325-2, 335-1, 335-2, and 335-3 may maintain pointers which are linked with other resource DBs in addition the resource data, as described above with reference to FIG. 1. The link relationship is illustrated by dashed-lines in FIG. 4. Due to this link relationship, the devices may acquire resource data from resource DBs that they do not maintain.

The interaction domain 200 provides the user with a combined view for accessing the resources in the resource domain 300, and thus provides a method and a means for interacting with the resources. The resources of the resource domain 300 are accessible through interaction APIs.

3. Open M2M Architecture Diagram 3.1 Functional Elements

Figure 5:
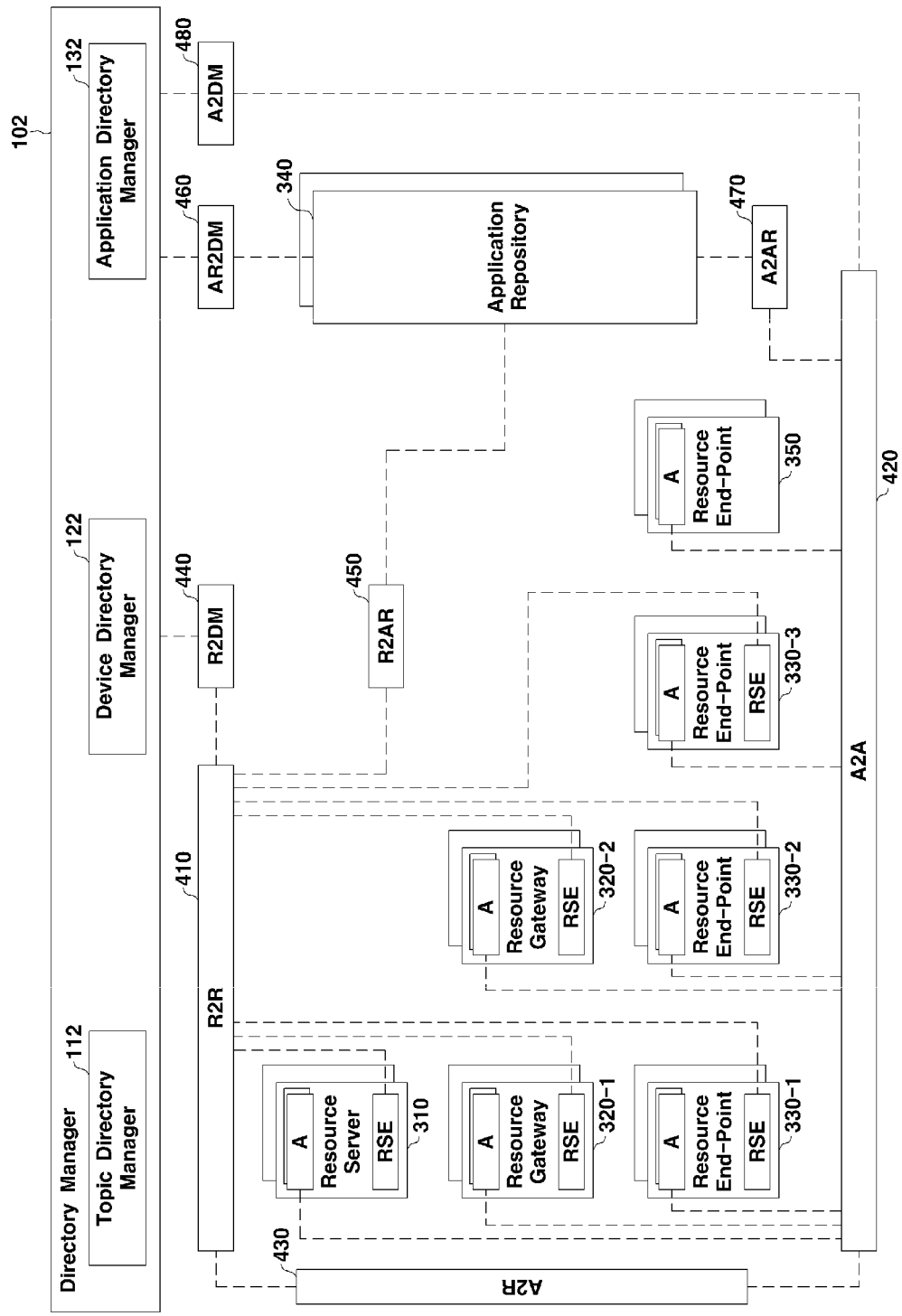
FIG. 5 is a view showing functional elements and reference interfaces of an open M2M architecture.

Hereinafter, the functional elements of the open M2M architecture will be described in detail with reference to FIG. 5. FIG. 5 is a view showing the functional elements and reference interfaces of the open M2M architecture.

As shown in FIG. 5, the open M2M system includes an application A, a Resource Service Entity (RSE), an application repository 340, and a directory manager 102 as functional elements.

The application A is a software program which is mounted in an M2M device, and provides useful data to the user based on device resources and enables the user to control (manipulate) the device.

Herein, the M2M device having the application A installed/mounted therein includes a resource server 310, resource gateways 320-1 and 320-2, resource end-points 330-1, 330-2, and 330-3, and a legacy resource end-point 350 shown in FIG. 5.

The RSE is a functional module which is mounted in a device, and manages a system and data resources of the device. The RSE is responsible for networking, securing, registering/discovering, subscribing, and charging as well as managing the device resources. The resource DBs provided in the devices as described above may be included in the RSE.

The application repository 340 is a storage which is designed to upload and download applications, and manages information on applications and registers application information at an application directory manager 132.

A directory manager 102 includes a topic directory manager 112, a device directory manager 122, and an application directory manager 132.

The topic directory manager 112 manages topic-based registration/discovery and topic-based publication/subscription functions, the device directory manager 122 manages directory-based registration/discovery and topic-based publication/subscription functions, and the application directory manager 132 manages application-based registration/discovery and topic-based publication/subscription functions.

3.2 Reference Interfaces

Hereinafter, reference interfaces for interworking between the above-described functional elements in the open M2M architecture will be described in detail with reference to FIG. 5.

As shown in FIG. 5, the open M2M architecture includes R2R 410, A2A 420, A2R 430, R2DM 440, R2AR 450, AR2DM 460, A2AR 470, and A2DM 480 as reference interfaces.

The R2R (RSE-to-RSE) 410 is a reference interface for providing normal functions for interworking between RSEs. The R2R 410 provides 1) a function of registering between the RSEs, 2) a function of getting, putting, posting, and deleting data between the RSEs, and 3) a function of requesting an RSE function such as data management, network management, security management, and group management between the RSEs/responding to the request.

The A2A (Application-to-Application) 420 is a reference interface for providing normal functions for interworking between applications A. The A2A 420 supports 1) a normal function between the applications A, and 2) a remote method invocation function between the applications A.

The A2R (Application-to-RSE) 430 is a reference interface for providing normal functions for interworking between the application A and the RSE. The A2R 430 supports 1) a function of registering the application A at the RSE, 2) a function of getting, putting, posting, and deleting data between the application A and the RSE, and 3) a function of requesting an RSE function such as data management, network management, security management, and group management between the application A and the RSE/responding to the request.

The R2DM (RSE-to-Directory Manager) 440 is a reference interface for providing normal functions for interworking between the RSE and the directory manager 102. The R2DM 440 supports 1) a function of registering, by the RSE, device information (an ID, a name, a location, a keyword, a network address, etc.) at the directory manager 102, 2) a function of discovering, by the RSE, a topic/device/application in the directory manager 102, and 3) a function of subscribing, by the RSE, to the topic of the topic directory manager 112.

The R2AR (RSE-to-Application Repository) 450 is a reference interface for providing normal functions for interworking between the RSE and the application repository 340. The R2AR 450 supports a function of downloading, by the RSE, an application from the application repository 340.

The AR2DM (Application Repository-to-Directory Manager) 460 is a reference interface for providing normal functions for interworking between the application repository 340 and the directory manager 102. The AR2DM 460 supports a function of registering, by the application repository 340, application information (an ID, a name, a URI, a category, a keyword, etc.) stored in the application repository 340 at the directory manager 102.

The A2AR (Application-to-Application Repository) 470 is a reference interface for providing normal functions for interworking between the application A and the application repository 340. The A2AR 470 supports a function of uploading the application A onto the application repository 340.

The A2DM (Application-to-Directory Manager) 480 is a reference interface for providing normal functions for interworking between the application A and the directory manager 102. The A2DM 480 supports 1) a function of discovering, by the application A, a topic, a device, and an application in the directory manager 102, 2) a function of creating, by the application A, a topic in the topic directory manager 112 of the directory manager 102, and 3) a function of subscribing, by the application A, to the topic of the topic directory manager 112.

3.3 Downloading Application by Functional Element and Reference Interface

A process of downloading "an application for controlling another device" to "a device" through the reference interfaces described above will be described in detail. This process may be performed in two methods: 1) one method performing the process by intervention of the user; and 2) the other method performing the process automatically by the device. Hereinafter, these methods will be described.

In the case of the method of 1), the user may acquire information of another device by discovering another device as desired through the A2R 430 or the A2DM 480 using the application A. In addition, the user may acquire information of a desired application from among the applications of another device in the directory manager 102 through the A2DM 480 using the application A of the device. The information of another device acquired beforehand may be used for acquiring the information of the application.

Next, the user may request downloading of the application from the application repository 340 through the A2AR 470 using the application A of the device. The download request may include the application information acquired beforehand.

Accordingly, the application repository 340 transmits the application to the device of the user through the R2AR 450, and as a result, the application is downloaded to the device of the user.

In the case of the method of 2), the RSE of the device acquires information of another device by discovering another device as desired through the R2R 410 or the R2DM 440. In addition, the RSE of the device acquires information of a desired application from among the applications of another device in the directory manager 102 through the R2DM 440. The information of another device acquired beforehand may be used for acquiring the information of the application.

Next, the RSE of the device may request downloading of the application from the application repository 340 through the R2AR 450. The download request may include the application information acquired beforehand.

Accordingly, the application repository 340 transmits the application to the device of the user through the R2AR 450, and as a result, the application is downloaded to the device of the user.

Hereinafter, a process of downloading "an application for a device" to a "device" through the reference interfaces will be described in detail. This process may be performed in two methods: 1) one method performing the process by intervention of the user; and 2) the other method performing the process automatically by the device. Hereinafter, these methods will be described.

In the case of the method of 1), the user may acquire information of a desired application from among the applications of the device in the directory manager 102 through the A2DM 480 using the application A. The information of the device may be used for acquiring the information of the application.

Next, the user may request downloading of the application from the application repository 340 through the A2AR 470 using the application A. The download request may include the application information acquired beforehand.

Accordingly, the application repository 340 transmits the application to the device of the user through the R2AR 450, and as a result, the application is downloaded to the device of the user.

In the case of the method of 2), the RSE of the device acquires information of a desired application from among the applications of the device in the directory manager 102 through the R2DM 440. The information of the device may be used for acquiring the information of the application.

Next, the RSE of the device may request downloading of the application from the application repository 340 through the R2AR 450. The download request may include the application information acquired beforehand.

Accordingly, the application repository 340 transmits the application to the device of the user through the R2AR 450, and as a result, the application is downloaded to the device of the user.

4. CSF Provided in Open M2M Architecture

A node maintains an Application Entity (AE) and/or a Common Service Entity (CSE). In this case, the node may maintain at least one AE. In addition, the node may maintain the CSE or may not maintain the CSE. The node which does not maintain the CSE may be called an Application Dedicated Node (ADN). The node which maintains the CSE normally maintains one CSE, but is not limited to one CSE.

The "node" recited herein may correspond to the "device" described above, the "AE" may correspond to the "application A or an application instance," and the CSE may correspond to the "RSE" as described above. However, the node, the AE, and the CSE may be implemented in types other than the above-described device, application A or application instance, and RSE.

The CSE provides Common Services Functions (CSFs). The CSFs provided by the CSE include 1) an Application and Service Layer Management (ASM) CSF, 2) a Device Firmware Management Function (DFMF) CSF, 3) a DIScovery (DIS) CSF, and 4) a Group Management (GMG) CSF. Hereinafter, the CSFs will be explained one by one.

4.1 ASM CSF

The ASM CSF manages the AEs and the CSEs of the nodes.

Herein, the ASM CSF includes a function of upgrading the AEs as well as a function of setting/configuring of the CSE functions, a function of diagnosing/troubleshooting a problem (trouble), and a function of upgrading.

The nodes include Application Dedicated Nodes (ADNs), Application Service Nodes (ASNs), Middle Nodes (MNs), and Infrastructure Nodes (INs).

4.2 DFMF CSF

The DFMF CSF manages a lifecycle of firmware related to a device.

The device firmware includes firmware modules and artifacts (for example, setting/configuration files) which are maintained on the device. The device may maintain one or more firmware images and provide capability to manage individual firmware images. The lifecycle of the firmware includes actions to download, update, or remove a firmware image. In addition, the firmware can download and update by the same action (single action).

4.3 DIS CSF

The DIS CSF may limit the scope of information which is returned to an originator using filter criteria provided by the originator. The filter criteria may be keywords, an identifier (ID), a location, and semantic information, or a combination thereof.

A discovery request may be forwarded to the address of a resource (for example, a URI) where the discovery is to be performed. Upon receiving such a discovery request, the DIS CSF discovers, identifies, and returns matching information regarding the discovered resource according to the filter criteria.

A successful response to the discovery request may include the discovered information or the address of the discovered resource (for example, the URI). In the latter case, the originator may retrieve the resource using the discovered address. In addition, based on policies or originator's request, the CSE which receives the discovery request may forward the discovery request to other registered ASN-CSEs, MN-CSEs, or IN-CSEs.

4.4 GMG CSF

The GMG CSF handles a group-related request. Herein, the "group" may be the above-described "topic."

The GMG CSF manages a group and a membership thereof. The GMG CSF supports bulk operations on multiples resources of interest, and aggregates the results thereof. The GMG CSF enables grouping-based access control. When needed and available, the GMG CSF can leverage the existing capabilities of the underlying network including broadcasting/multicasting.

The GMG CSF may handle the requests from the AEs and/or other CSEs.

The grouping enables the M2M system to perform bulk operations on multiple devices, applications, or resources. The GMG CSF manages the grouping-related resources and actions.

The GMG CSF handles the requests to create, query, update, and delete a group. The AE or the CSE may request the creation/retrieve/update/deletion of a group as well as the addition and deletion of members of the group.

The GMG CSF may create one or more groups in CSEs of any of the nodes in the M2M system for a particular purpose. The particular purpose includes access control, device management, fanning-out (multicasting) common operations regarding a group of devices. The GMG CSF may be a function for achieving the particular purpose in a simple way.

The GMG CSF handles the request to retrieve the information (for example, URI, metadata, etc.) of a group and associated members thereof.

The GMG CSF manages the group membership. The GMG CSF handles requests to add or remove members to and from a group's member list. A member may belong to one or more groups. A group may be a member of another group. When a new member is added to a group, the GMG CSF validates whether the member complies with the purpose of the group.

When access control is facilitated using a group, only the members with the same authority to access a "specific resource" may be included in the same group. Herein, the specific resource may be a device/resource which provides information as well as a virtual device/resource which is created by the GMG CSF.

In addition, only AEs or CSEs which have a common role with regards to access authority are included in the same group. Herein, the role may be a service which is provided by AEs or CSEs, but is not limited to this.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

The invention claimed is:

1. A group management method in a machine to machine (M2M) system, the group management method comprising:
   managing, by a Group Management (GMG) Common Service Function (CSF) of the M2M system, a group and a plurality of members belonging to the group; and
   receiving and handling, by the GMG CSF of the M2M system, a group-related request,
   wherein the plurality of members included in a same group are application entities (AEs) validated by the GMG CSF to have a common role and/or common service entities (CSEs) validated by the GMG CSF to have the common role,
   wherein having the common role comprises having a same role with regards to access control towards a specific resource, and the specific resource comprises at least one of a physical element which stores information or a virtual element which stores information.

2. The group management method of claim 1, wherein the handling comprises performing common operations for the plurality of members included in the group, and aggregating results of the common operations.

3. The group management method of claim 1, wherein the handling comprises handling group-based access control.

4. The group management method of claim 1, wherein the plurality of members belong to one or more groups.

5. The group management method of claim 1, wherein the managing comprises handling requests to create, query, update, and delete a given group.

6. The group management method of claim 1, wherein the managing comprises performing at least one of creation, retrieve, update, and deletion of a given group.

7. The group management method of claim 1, wherein the managing comprises performing at least one of addition and deletion of members of the group.

8. The group management method of claim 7, wherein the managing comprises, when a member is added to the group, validating whether the member complies with a purpose of the group.

9. The group management method of claim 1, further comprising:
   managing an AE of a device; and
   managing a CSE of the device.

10. The group management method of claim 9, wherein the managing the CSE comprises performing at least one of configuration of CSE functions, troubleshooting of a problem, and upgrading, and
    wherein the managing the AE comprises upgrading the AE.

11. The group management method of claim 9, further comprising managing a lifecycle of firmware related to the device.

12. The group management method of claim 11, wherein the firmware comprises firmware modules and artifacts which are maintained on the device, and
    wherein the artifacts comprises a configuration file.

13. The group management method of claim 11, wherein the lifecycle of the firmware comprises at least one of actions to download, update, and remove the firmware.

14. The group management method of claim 13 wherein the firmware is downloaded and updated by a same action.

15. The group management method of claim 1, further comprising:
    upon receiving a discovery request, discovering; and
    returning a result of the discovering, and
    wherein the returning comprises limiting a scope of information which is returned using filter criteria.

16. The group management method of claim 15, wherein the filter criteria comprise at least one of keywords, an identifier, a location, and semantic information.

17. The group management method of claim 15, wherein the result of the discovering comprises an address of a discovered resource according to the filter criteria.

18. The group management method of claim 15, further comprising forwarding the discovery request to another device.

19. A group management method in an machine to machine (M2M) system, the group management method comprising:
    managing, by a Group Management (GMG) Common Service Function (CSF) of the M2M system, a group and a plurality of members belonging to the group; and
    receiving and handling, by the GMG CSF of the M2M system, a group-related request,
    wherein the handling comprises handling group-based access control,
    wherein the plurality of members included in a same group are application entities (AEs) validated by the GMG CSF to have a common role and/or common service entities (CSEs) validated by the GMG CSF to have the common role, and
    wherein having the common role comprises having a same role with regards to access control towards a specific resource, and the specific resource comprises at least one of a physical element which stores information or a virtual element which stores information.

20. The group management method of claim 19, wherein an authority to access the plurality of members belonging to the group is assigned to the group, and a member of the group obtains the authority to access the plurality of members.

* * * * *